US012706925B2

(12) United States Patent
Ikoué

(10) Patent No.: US 12,706,925 B2
(45) Date of Patent: Aug. 11, 2026

(54) COMPUTER-IMPLEMENTED SYSTEM FOR COMPREHENSIVE CYBERSECURITY THREAT MODELING AND ANALYSIS

(71) Applicant: Stephan Ikoué, Spokane, WA (US)

(72) Inventor: Stephan Ikoué, Spokane, WA (US)

(73) Assignee: Stéphane Ikoué, Seattle, WA (US)

( * ) Notice: Subject to any disclaimer, the term of this patent is extended or adjusted under 35 U.S.C. 154(b) by 79 days.

(21) Appl. No.: 18/598,105

(22) Filed: Mar. 7, 2024

(65) Prior Publication Data

US 2025/0159005 A1 May 15, 2025

Related U.S. Application Data

(60) Provisional application No. 63/533,357, filed on Aug. 18, 2023.

(51) Int. Cl.
*H04L 29/06* (2006.01)
*H04L 9/40* (2022.01)

(52) U.S. Cl.
CPC ................................ *H04L 63/1416* (2013.01)

(58) Field of Classification Search
CPC . H04L 63/1416; H04L 63/1433; H04L 63/20; G06F 21/577
See application file for complete search history.

(56) References Cited

U.S. PATENT DOCUMENTS 10,970,395 B1 * 4/2021 Bansal .................. G06F 21/566
11,381,589 B2 * 7/2022 Tassoumt ........... G06Q 30/0208
11,757,907 B1 * 9/2023 Berger ..................... G06N 7/01 726/23
2021/0192412 A1 * 6/2021 Krishnaswamy ........................... G06Q 10/06375
2021/0406240 A1 * 12/2021 Sheppard ............ G06F 16/2255
2023/0229764 A1 * 7/2023 Vohra .................... G06F 21/568
2023/0283521 A1 * 9/2023 Berger .................... H04L 63/20 709/223
2024/0303361 A1 * 9/2024 Roper, Jr. ............... H04L 63/10
2025/0021350 A1 * 1/2025 Schlicher .............. G06F 9/4498
2025/0045441 A1 * 2/2025 Roper, Jr. ........... G06F 21/6218
2025/0047698 A1 * 2/2025 Rund .................. H04L 63/1425
2025/0159005 A1 * 5/2025 Ikoué .................. H04L 63/1416

* cited by examiner

*Primary Examiner* — Mahfuzur Rahman

(57) ABSTRACT

This invention relates to a computer-implemented threat modeling system, designed to enhance cybersecurity processes. The system comprises a threat modeling engine linked with a user interface module, capable of processing electronic input data and generating digital representations of threat scenarios. It includes a database system for storing crucial data, such as user input, generated threat scenarios, and mitigation strategies, an artificial intelligence module that employs machine learning and natural language processing to autonomously generate threat scenarios, a collaboration module to facilitate interactive exchanges among users with capabilities for real-time communication and secure sharing of threat models. Additionally, it incorporates a methodology and framework selection module for applying various threat modeling methodologies and frameworks. An integration module enables interfacing with external systems for data import and export, enhancing the accuracy of threat modeling.

19 Claims, 3 Drawing Sheets

COMPUTER-IMPLEMENTED SYSTEM FOR COMPREHENSIVE CYBERSECURITY THREAT MODELING AND ANALYSIS

FIELD OF INVENTION

The present invention relates generally to the field of cybersecurity, specifically focusing on computer-implemented systems for threat modeling and analysis.

BACKGROUND

In the evolving landscape of cybersecurity, threat modeling has emerged as a critical process for identifying and addressing potential security threats in the design and development of digital systems. Traditional threat modeling approaches have encountered several limitations and drawbacks that necessitate a more advanced solution.

One of the primary challenges in conventional threat modeling is the complexity and steep learning curve associated with it. Users often find it difficult to navigate through complex interfaces and workflows, which impedes the adoption and effective utilization of these tools. This complexity is further compounded by the time-consuming nature of manual threat modeling processes making it challenging for organizations to keep pace with the rapid evolution of cybersecurity threats.

Another limitation is the lack of standardization in threat modeling practices. Different organizations and teams tend to employ varied methodologies, leading to inconsistencies and inefficiencies in threat identification and mitigation. This lack of a unified approach often results in vulnerabilities being overlooked, as the diverse methods may not comprehensively cover all potential threats.

Collaboration is also often limited in traditional threat modeling tools. The inability to facilitate smooth interaction and information sharing among different teams, such as security and development operations, hinders the development of a cohesive and comprehensive security strategy. This limitation is particularly pronounced in scaling organizations, where maintaining consistent threat modeling practices across various applications and teams becomes increasingly difficult.

Additionally, traditional threat modeling tools have struggled with effectively maintaining and updating models. As cybersecurity threats evolve rapidly, the ability to keep threat models current and reflective of the latest threats is crucial. However, manual updating processes are resource-intensive and often lag behind the emergence of new threats.

In the realm of risk prioritization, existing tools frequently fall short in accurately assessing and prioritizing risks. Without advanced analytical capabilities, these tools struggle to provide a nuanced understanding of the impact and likelihood of different threats, leading to suboptimal allocation of security resources.

Finally, the integration of threat modeling tools with other cybersecurity resources is often limited. Comprehensive threat analysis requires the pooling of various sources of intelligence and data, which traditional methods may not effectively support. The absence of a comprehensive and integrated framework hampers the effectiveness of threat modeling in addressing the dynamic nature of cybersecurity risks.

These limitations highlight the need for an innovative approach to threat modeling, one that addresses these challenges and paves the way for more effective, efficient, and scalable cybersecurity practices. The development of a new solution in this domain is not just a response to the existing deficiencies, but also a proactive step towards revolutionizing the process of identifying and mitigating cybersecurity threats. The increasingly complex digital landscape demands a tool that simplifies the threat modeling process, enhances collaboration, standardizes methodologies, and integrates advanced technologies for dynamic and comprehensive threat analysis. This solution must be capable of adapting to the rapid growth and changing nature of both threats and organizational structures, while offering a user-friendly and efficient platform for cybersecurity professionals. The emergence of such an advanced tool is essential to meet the evolving needs of cybersecurity and to provide robust protection in an increasingly digital world.

It is within this context that the present invention is provided.

SUMMARY

The present invention relates to a computer-implemented threat modeling system, designed to enhance the process of identifying and mitigating cybersecurity threats. The system comprises a user interface (UI), a threat modeling engine, a database system, an artificial intelligence (AI) module, a collaboration module, and various other components to support comprehensive threat modeling operations.

One of the key features is the AI/ML-driven Threat Modeling as Code (TMAC), which automates threat scenario generation from code, offering speed and accuracy in modeling and assessing architectural designs. The system's AI-powered data model mapping capability ensures effortless ingestion and analysis of diverse data models. Threat Modeling Of Code (TMOC) may also be implemented.

The threat modeling engine is at the core of the system, responsible for processing user inputs, conducting automated threat analysis, and generating detailed threat scenarios based on selected methodologies and frameworks. It utilizes the SECURE methodology for systematic threat identification, analysis, and mitigation and integrates with various threat modeling frameworks BROAD and START (custom frameworks) as well as known methodologies, including but not limited to STRIDE, DREAD, and CARVER, for comprehensive coverage. It will be understood by the reader that any other suitable frameworks may also be supported while maintaining the core principles of the system described herein. The threat modelling engine employs AI/ML algorithms to automatically generate threat scenarios and assess risks based on input data in effectively any framework desired.

The AI/ML integration layer incorporates GPT-4 and other advanced LLMs for contextual threat modeling and multilingual support. AI-driven algorithms analyze data to provide actionable insights and recommendations. These algorithms are involved in data gathering, natural language processing (NLP), pattern recognition, contextual analysis, automated scenario generation, risk assessment, and prioritization. The AI algorithms continuously learn and adapt based on real-world data and user feedback, enhancing the accuracy and relevance of the generated threat scenarios and risk assessments.

The collaboration and communication layer is configured to enable and facilitate interactive information exchange and collaboration among multiple users engaged in threat modeling activities, and including features for real-time discussions, annotations, version control, and secure sharing of threat models, thereby fostering a collaborative environment for cybersecurity professionals.

The system integrates AI-driven learning modules for on-the-go threat modeling assistance, providing interactive tutorials and guided threat modeling exercises. It offers automated AI-driven threat modeling reports and guidance. Additionally, the system supports integration with various third-party tools, frameworks, and platforms, integrating with threat modeling frameworks like OWASP Threat Dragon and Microsoft Threat Modeling Tool, and allowing import/export of threat models, data, and reports.

The data management and security layer manages user data, threat models, and sensitive information securely, incorporating encryption, access controls, and secure authentication mechanisms. It ensures compliance with data protection and privacy regulations. The cloud infrastructure deploys the application on scalable and reliable cloud platforms like AWS, Azure, and Google Cloud, ensuring high availability, scalability, and performance. The backend services house the application's core business logic, algorithms, and functionalities, handling data processing, analysis, and generation of threat scenarios and risk assessments. The databases store threat models, user profiles, historical data, and metadata, utilizing both relational and NoSQL databases for efficient data management.

The system's analytics and reporting provide insights through data analytics and visualizations, generating threat modeling reports, risk assessments, and actionable recommendations. The user management and authentication manage user profiles, roles, and permissions, implementing secure authentication and authorization mechanisms. Communication APIs enable communication between different layers and modules, facilitating real-time updates, notifications, and alerts. The cross-platform compatibility ensures the tool can be used across various platforms, including web, mobile, and desktop.

The user interface is the front-facing component where users interact with the tool. It offers an intuitive dashboard for creating, managing, and visualizing threat models, and provides access to various features, reports, and collaboration tools through a user-friendly interface. The UI supports functionalities including threat modeling, collaboration, research, and reporting, and offers a seamless multilingual user experience.

To address the complex landscape of cybersecurity threats, the system incorporates "MITRE Frameworks" within its threat modeling engine. Although MITRE Frameworks like ATT&CK, DEFEND, Engage, Caldera, and Atlas are comprehensive and growing in detail, their adoption has been limited due to their complexity. Recognizing this, the system aims to leverage these frameworks to enhance its capability in simulating, identifying, and mitigating a broad spectrum of cybersecurity threats. By integrating MITRE Frameworks, the system offers users an advanced, structured approach to threat modeling, making these sophisticated frameworks accessible and usable in practical threat modeling scenarios.

In some embodiments, the system includes specialized modules for different sectors and technologies, such as blockchain, quantum systems, AI systems, and mobile device security. These specialized modules provide targeted threat modeling capabilities for various specific technological domains.

The blockchain integration of the system is a pivotal feature designed to enhance the security and integrity of the threat modeling process. By leveraging blockchain technology, the system securely stores threat data, scenarios, and mitigation strategies, ensuring data immutability and transparency. This integration not only provides an added layer of security against data tampering but also fosters trust among users by maintaining an unalterable record of threat modeling activities. The use of blockchain technology facilitates a decentralized approach to data storage, thereby mitigating risks associated with centralized data repositories. Moreover, the blockchain component enables secure, traceable transactions and interactions within the system, enhancing accountability and auditability. This feature is particularly beneficial for organizations that require stringent data security measures and for those operating in highly regulated industries, where maintaining the integrity of threat intelligence and modeling data is crucial. The system will also Threat Model Blockchain, quantum computing mechanism, AI/ML, etc.

In some embodiments, the system features an integration module designed to interface with external systems and tools for data import and export. This integration enhances the accuracy of threat modeling by leveraging external data sources and tools.

In some embodiments, the system includes a feature that allows for the importation of threat-related data from various file formats. This enables users to utilize existing threat intelligence and sources in their threat modeling process. The system accommodates data from CSV files, where users can map data columns to corresponding threat modeling attributes in the tool. The imported data is checked for consistency and accuracy, with feedback provided on the success or failure of the import process.

In addition to CSV files, the system supports data import from XML and JSON files. Users can map imported data to threat modeling elements using XML schemas. The tool checks XML data against these schemas to identify any issues, and users can review and confirm the results of the import. Future developments will add support for images or optical files such as PDF and PNG formats.

The tool also allows for the importation of data from JSON files. A visual mapping interface is provided for users to align JSON properties with threat modeling attributes. The system parses and validates JSON data for correctness, and users are given a summary of the imported data, including any discrepancies.

The system also enables importing textual threat information from common document formats like DOCX and PDF. It processes these documents to extract text, which is then organized and made available for threat modeling analysis.

For organizations transitioning from other threat modeling tools, the system offers the capability to import existing threat models. It supports formats from commonly used tools and converts these models to the system's format while preserving essential threat data.

For larger datasets, the system features a bulk import functionality. This allows users to upload and integrate large quantities of data into their threat models efficiently.

One of the system's functionalities is the System UTMod Framework, which assists in creating threat models. This framework provides guidance through the threat modeling process and suggests components and threats that align with the system's best practices.

The tool includes ModAdvisor, an AI-driven component for generating threat scenarios. This feature uses initial threat models to generate scenarios and provides explanations using the system's threat intelligence.

The system features a component, AutoComply, which assists in risk assessment and mitigation. This component evaluates risks associated with threat scenarios and offers automated mitigation recommendations. It allows users to customize mitigation strategies, showcasing the system's flexibility.

The system integrates real-time threat intelligence through its ThreatTrove feature. This provides users with access to current threat data from various global sources, ensuring the system is up-to-date with global threat developments. This feature aids in enhancing the effectiveness of the threat modeling process.

Custom onboarding is an aspect of the platform that accommodates the unique requirements of different organizations. This feature allows for a personalized onboarding experience, showcasing the platform's adaptability to various organizational needs. It includes simulated scenarios that are tailored to meet specific organizational requirements.

The platform offers an API security assessment feature, designed to provide a simplified demonstration of API security within the threat modeling tool. Users can visualize potential API vulnerabilities and receive initial mitigation suggestions, highlighting the platform's capabilities in API security.

System Voice is a feature that allows users to interact with the threat modeling tool using voice commands. This voice-powered threat modeling capability enables users to create threat models, generate scenarios, and access threat intelligence seamlessly through voice interaction, enhancing the convenience and efficiency of the modeling process.

The platform's powerful API facilitates advanced threat modeling. It showcases the capabilities of the API, allowing users to access, manipulate, and analyze threat data programmatically. This feature highlights the platform's extensibility and adaptability to various user needs.

Proprietary methodologies for unique threat models are also supported by the platform. It provides flexibility in accommodating unique threat modeling methodologies, allowing users to configure and apply proprietary methodologies within the threat modeling process. This feature demonstrates the platform's adaptability to diverse requirements.

The platform caters to a wide range of users, from cybersecurity professionals to children, with tools and modules tailored to each audience. This includes sophisticated tools for professionals and engaging educational modules for children, showcasing the platform's versatility.

NIST frameworks are integrated into the platform, particularly in digital identity management. This incorporation positions the platform at the forefront of compliance and best practices, aligning it with recognized standards like NIST SP 800-63 and 800-53B.

BRIEF DESCRIPTION OF THE DRAWINGS

Various embodiments of the invention are disclosed in the following detailed description and accompanying drawings.

Figure 1:
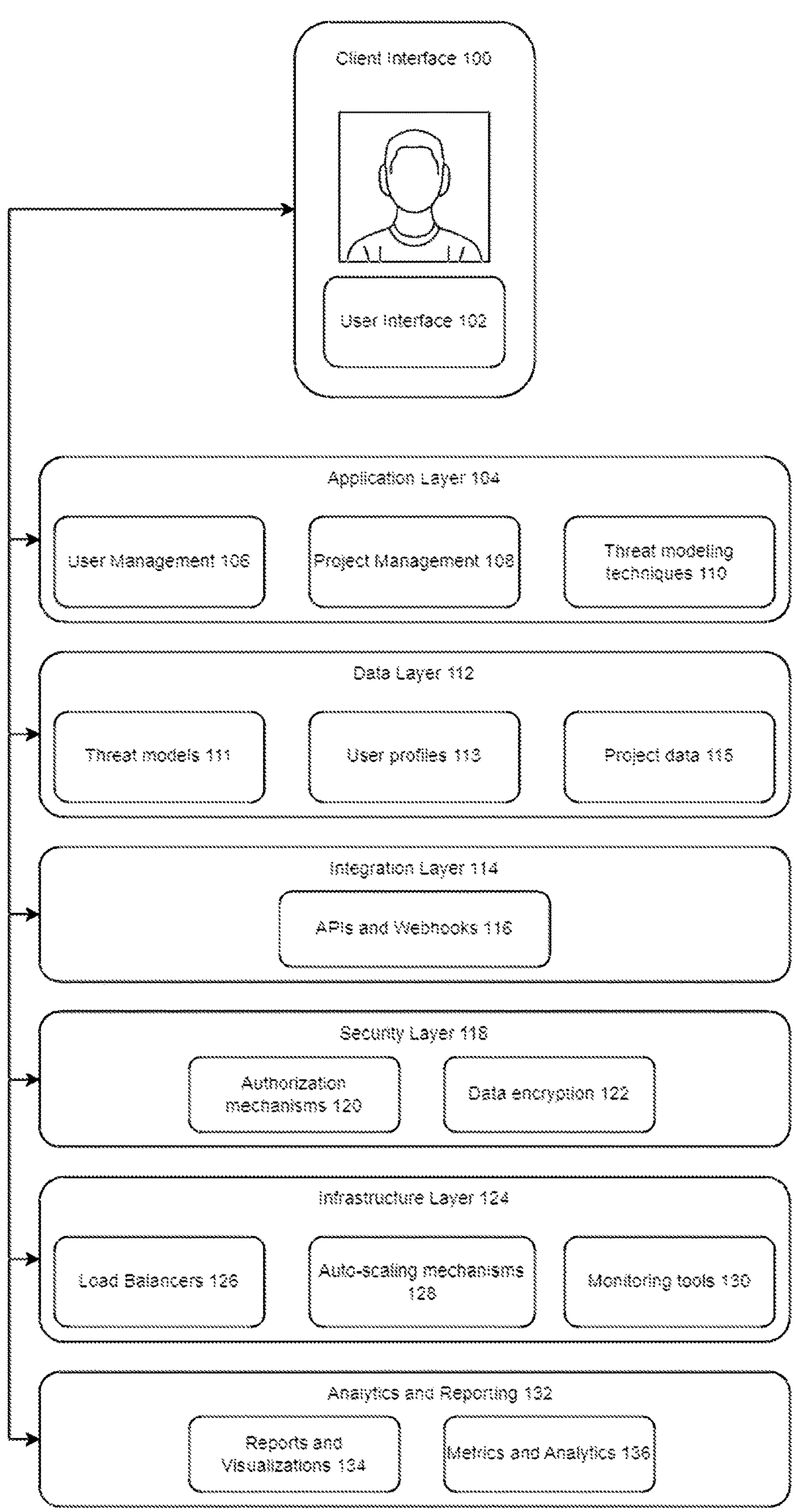
FIG. 1 illustrates the system layer architecture of the computer-implemented threat modeling system. It shows various components such as the Client Interface, Application Layer, Data Layer, Integration Layer, Security Layer, and Infrastructure Layer, along with their respective sub-components and functionalities.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Definitions

The terminology used herein is for the purpose of describing particular embodiments only and is not intended to be limiting of the invention.

As used herein, the term "and/or" includes any combinations of one or more of the associated listed items.

As used herein, the singular forms "a," "an," and "the" are intended to include the plural forms as well as the singular forms, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

DESCRIPTION OF DRAWINGS

The present invention pertains to a computer-implemented threat modeling system designed to identify and mitigate cybersecurity threats in a comprehensive manner. This system is structured to process, analyze, and manage threat modeling data, utilizing a combination of user interfaces, databases, artificial intelligence modules, and collaborative tools. The invention incorporates various technical aspects and modules to facilitate an effective and efficient approach to cybersecurity threat modeling.

At the core of the invention lies the threat modeling engine, which is responsible for processing input data related to threat modeling and generating corresponding threat scenarios. This engine is designed to be versatile, supporting multiple threat modeling methodologies and frameworks to accommodate a range of cybersecurity requirements and scenarios.

The user interface of the invention is developed to provide an intuitive and user-friendly platform for users to interact with the system. This interface allows users to engage with the system's features effectively, enhancing the overall user experience in threat modeling tasks. Furthermore, the interface is equipped to support multilingual interactions, making the system accessible to a global user base.

An integral component of the invention is the artificial intelligence module, which leverages advanced algorithms, including natural language processing and machine learning techniques, to analyze input data and automatically generate threat scenarios. This AI module is a key element in enhancing the system's capability to identify and evaluate potential threats accurately.

The collaboration module included in the invention facilitates effective communication and information sharing among multiple users engaged in threat modeling. This module is designed to support a collaborative environment, enabling users to share insights, models, and best practices in real time.

Additionally, the invention encompasses various specialized modules tailored to address the unique requirements of different technological domains, such as blockchain, quantum systems, and AI systems. These modules provide focused threat modeling capabilities, ensuring that the system is adaptable to a wide range of technological contexts.

The system's architecture also includes an integration module for interfacing with external systems and tools, a cloud-based infrastructure for scalable and flexible operation, a blockchain integration component for enhanced data security, and a reporting and visualization module for comprehensive data analysis and presentation.

FIG. 1 illustrates a block diagram of the example system layer architecture, encompassing various components that collectively form the computer-implemented threat modeling system.

The Client Interface 100 serves as the front-end component of the platform, accessible through web browsers or mobile applications. It provides the user interface 102 for interaction with the platform, including the creation and management of threat modeling projects and accessing reports. The Client Interface 100 is designed with responsive design principles, ensuring an optimal user experience across a range of devices.

Within the Application Layer 104, the core of the platform is established, containing the business logic and functional modules. This layer 104 implements various features and functionalities, such as user management 106, project management 108, and threat modeling techniques 110. Programming languages and frameworks are utilized to handle user requests and process data effectively.

The Data Layer 112 manages the storage and retrieval of data within the platform. It consists of either a relational database management system, such as PostgreSQL or MySQL, or a NoSQL database like MongoDB. This layer 112 stores threat models 111, user profiles 113, project data 115, and other relevant information, ensuring data integrity, security, and scalability.

The Integration Layer 114 facilitates integration with external tools, services, and APIs to enhance the platform's functionality. It includes APIs and webhooks 116 for integration with issue trackers, security scanners, threat intelligence feeds, and other systems. This layer 114 enables data exchange, automation, and synchronization between the Threat Modeling platform and external tools.

In the Security Layer 118, robust security measures are implemented to protect sensitive data and ensure the security of the platform. This layer 118 includes authentication and authorization mechanisms 120 to control access, along with encryption 122 for data transmission and storage, maintaining data confidentiality. Secure coding practices and adherence to industry security standards are employed to mitigate vulnerabilities.

The Infrastructure Layer 124 hosts the platform's components and provides necessary infrastructure resources. It can be deployed in a cloud environment, such as AWS, Azure, or Google Cloud, to leverage scalability, flexibility, and reliability. This layer 124 includes load balancers 126, auto-scaling mechanisms 128, and monitoring tools 130 to ensure high availability and performance.

Finally, the Analytics and Reporting component 132 includes modules for collecting and analyzing threat modeling data. It generates comprehensive reports and visualizations 134 to present insights and recommendations derived from threat modeling. Metrics and analytics 136 are provided to assess the effectiveness of threat modeling processes and identify areas for improvement.

Example System Modules:

The system of the invention also encompasses a suite of specialized modules designed to enhance cybersecurity threat modeling and management. These may include, but are not limited to:

- The Security Blueprint Modeling module, referred to as System Blueprints Modeler, is engineered to assist in the creation of comprehensive security blueprints. This module integrates security paradigms into threat modeling, ensuring that each aspect of the system's design is strategically fortified against cyber threats.
- The Automated Compliance Monitoring module, known as System AutoComply, automates the evaluation of threat models against prevailing industry standards and regulations. This automation simplifies adherence to compliance requirements, ensuring that threat models are consistent with established cybersecurity norms.
- The Lifecycle Security Integration module, termed System ModSecDevOps (Modeling Security, Development and Operations), is tailored to safeguard the entire development lifecycle. It emphasizes the implementation of secure coding practices from the initial development phase to final deployment, proactively identifying and addressing potential security vulnerabilities at early stages.
- The Blockchain Architecture Threat Modeling module, System ChainMod, offers tools specifically designed for analyzing and mitigating threats inherent in blockchain architectures. This module caters to the unique security considerations of blockchain systems.
- The Quantum System Threat Modeling module, System QuantumMod, provides tools and methodologies to assess and mitigate threats. This module represents a forward-thinking approach to securing emerging quantum computing technologies.
- The AI System Security module, System SecurAI, is dedicated to the threat modeling of AI systems. This module ensures that security measures keep pace with the advanced capabilities of AI technologies.
- The Mobile Device Security module, System MobileSecPro, also known as MobMod, specializes in the threat analysis of mobile platforms. It addresses the specific security challenges posed by mobile devices and their operating environments.

The Medical Device Security module, System ModMed-Central or ModMD, provides targeted security and threat modeling capabilities. This module is vital for protecting sensitive healthcare systems and technologies.

The Government Security Threat Modeling module, System ModGov, offers tools tailored for government security needs. This module ensures the cybersecurity integrity of public institutions.

The Cross-Platform Compatibility module, System UTModX, ensures that the threat modeling system operates seamlessly across various computing platforms, including diverse operating systems and cloud environments, enhancing system accessibility and flexibility.

System ThreatMod's Ark serves as a curated repository of pre-built threat models, offering resources for various scenarios and industries to expedite the threat modeling process.

System ThreatTrove functions as a dynamic repository of global threat intelligence, constantly updating with real-time threat information to provide proactive cybersecurity insights.

System ThreatWhispers presents an anonymous platform for the exchange of threat modeling feeds and news, fostering open discourse in the cybersecurity community.

System ThreatVoice transforms complex cybersecurity concepts into accessible narratives, making intricate technical details comprehensible for a broader range of users.

Finally, SystemLinkUp acts as an advanced threat research hub, facilitating collaboration and intelligence sharing among cybersecurity professionals, thus enriching collective knowledge and understanding in the realm of cyber threats.

Figure 2:
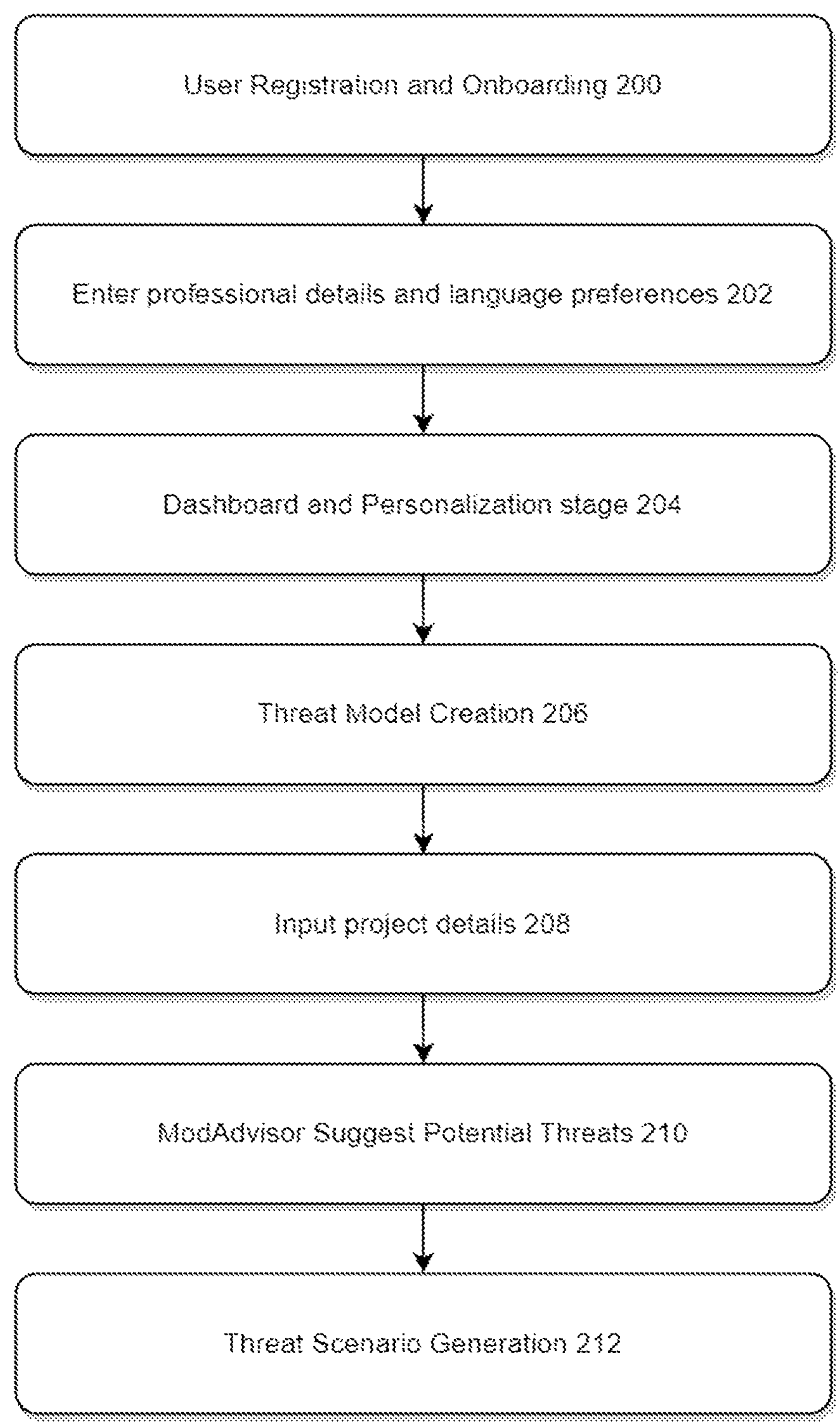
FIG. 2 presents a flowchart depicting the method steps of the Threat Modeling Workflow within the system. It outlines the sequential stages a user undergoes during the threat modeling process, starting from User Registration and Onboarding to Threat Scenario Generation.

FIG. 2 illustrates a flowchart depicting a high level overview of a user journey and Threat Modeling Workflow within the system. The flowchart provides a sequential overview of the key stages a user navigates during the threat modeling process.

The first stage, User Registration and Onboarding 200, involves users registering on the platform using their email or social media accounts. This step is followed by users specifying their role, industry, and language preferences during the onboarding process 202, which helps personalize their subsequent interactions with the platform. Once registered, users proceed to the Dashboard and Personalization stage 204. In this stage, users configure a personalized dashboard, which displays news, threat insights, and recommendations based on their preferences.

The Threat Model Creation step for Individual Users 206 begins with the user selecting "Create New Model" from the dashboard. The user then inputs project details, such as scope and context 208, to define the parameters of the threat modeling exercise.

Following the input of project details, the AI-powered ModAdvisor is engaged. Utilizing GPT-4 and LLMs, ModAdvisor suggests potential threats relevant to the project's context 210, considering factors like system architecture, user input, and historical data.

In the final stage, Threat Scenario Generation 212, ModAdvisor leverages its advanced algorithms to generate comprehensive threat scenarios. These scenarios are formulated based on a thorough analysis of the project's context, system architecture, user input, and relevant historical data. This step provides users with detailed and context-specific threat scenarios, enabling them to effectively identify and address potential cybersecurity risks.

Figure 3:
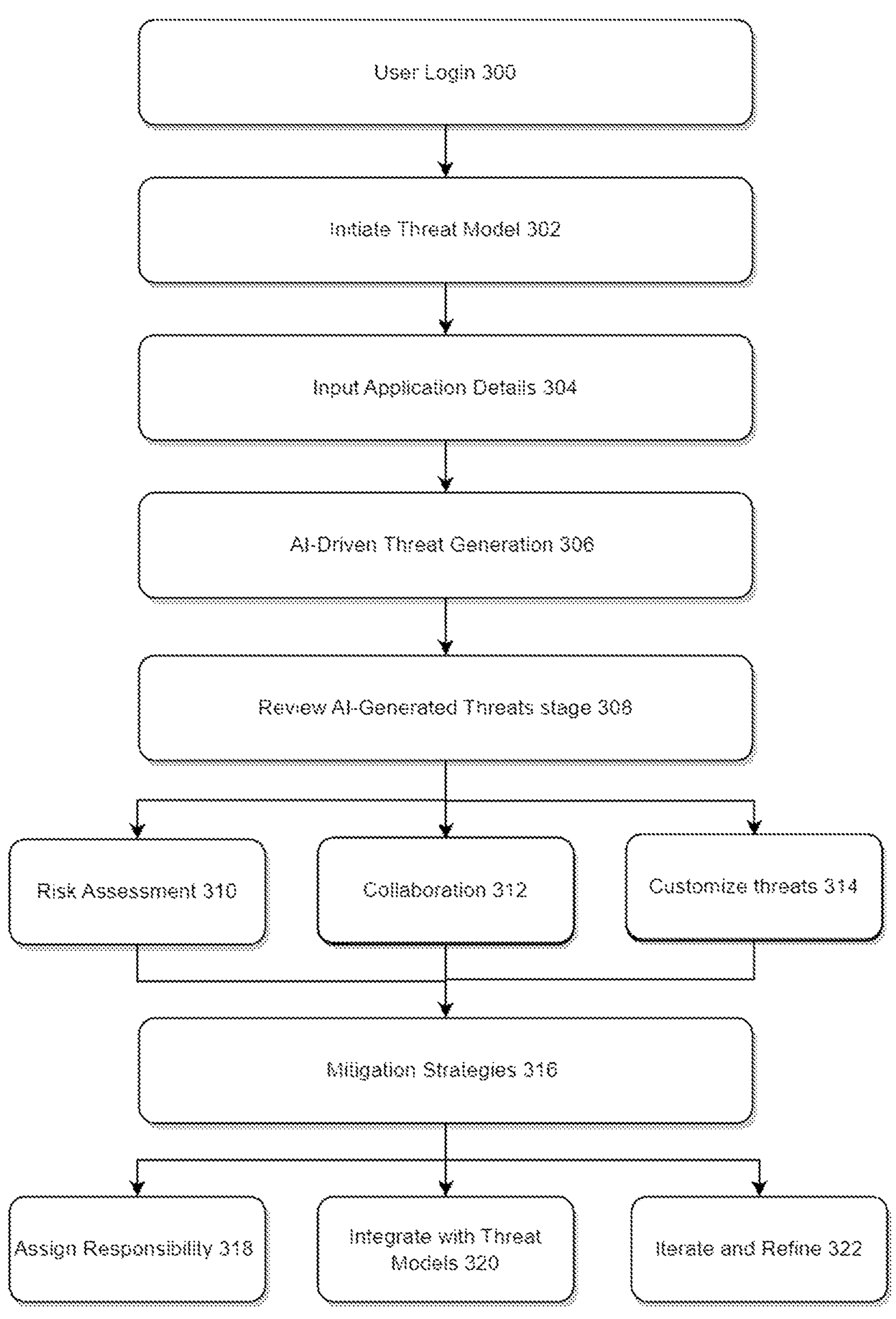
FIG. 3 details a comprehensive flowchart of the steps involved in the AI-driven threat modeling process. This figure expands on the user journey, illustrating methodological steps ranging from User Login to Access Threat Reports and Collaborative Feedback Loop.

FIG. 3 presents a detailed flowchart illustrating a more comprehensive set of steps involved in the threat modeling process using the threat modeling system. This figure expands on the user journey depicted in FIG. 2 by providing an in-depth sequence that a user undergoes during an example AI-driven threat modelling process, assuming they already have an account on the platform.

The process begins with User Login 300, where users access the system using their unique credentials. Following the login, the user engages in the Initiate Threat Model step 302, selecting the option to start a new threat modeling process or continue working on an existing model.

In Input Application Details 304, the user provides comprehensive information about the application, system, or process they are assessing. This information forms the foundation for the threat modeling exercise, encompassing aspects like system architecture, functionality, and potential vulnerabilities.

In AI-Driven Threat Generation 306 the user activates an AI feature such as ModAdvisor from FIG. 2 to generate potential threats based on the provided application details. This AI analysis utilizes advanced algorithms, including GPT-4, to intelligently and efficiently identify a wide range of potential threats. Once the AI presents its findings, the user reviews these in the Review AI-Generated Threats stage 308, fine-tuning the threat list by selecting, modifying, or deleting entries as necessary.

Optionally, users can engage in Risk Assessment 310, where the AI further evaluates each threat for potential impact and likelihood, assigning risk scores to prioritize threats based on their severity and likelihood of occurrence. Collaboration 312 is another optional step where users working in teams via platform collaboration features can share and collectively analyze the generated threats. In Customize Threats 314, users have the option to manually add or modify threats, leveraging their domain expertise to enhance the AI-generated threat list.

The platform then suggests Mitigation Strategies 316 for each identified threat, aiding users in selecting appropriate countermeasures to address the potential risks. Having received the suggested mitigation strategies, the user has a number of options.

The user may Assign Responsibility 318 as an optional collaborative step where responsibilities for implementing mitigation strategies are assigned to specific team members on the system, fostering accountability and efficient task distribution. The user may also immediately proceed to Integrate with Threat Models 320, where users working on existing models integrate the new findings. Alternatively, users may Iterate and Refine 322, continually improving the threat model by revisiting and revising the threats and strategies, ensuring that the model evolves in response to new information or changes in the system. The system will learn and improve based on user interactions, enhancing its effectiveness over time.

Other optional steps also become available at this stage such as generating detailed reports, engaging in a feedback loop for continuous improvement, and receiving updates on AI models and new threat intelligence.

The system also allows for text-driven threat modeling processes as an alternative process for threat modelling that complements the AI-driven process outlined in FIG. 3, where the user selects an AI-driven threat generation feature and inputs text-based abstractions of the application. The AI processes this textual information to generate a list of potential threats.

Collaborative Features

In the threat modeling system, collaborative features play a pivotal role in enhancing the user journey, both in the AI-driven and text-driven threat modeling processes. The integration of these features creates a dynamic, interactive, and inclusive environment, fostering a comprehensive approach to cybersecurity threat modeling.

Once users log into the system platform, they access their personalized dashboards. This personalized environment lays the groundwork for an effective and user-centric threat modeling experience. Users can initiate collaboration by selecting the "Collaborate" option, signaling the start of a team-oriented threat modeling session.

The ability to create or select a project for collaboration allows users to either embark on new threat modeling ventures or build upon existing projects. This flexibility facilitates continuous improvement and iteration of threat models. Inviting team members, stakeholders, or partners to join the collaborative session is made seamless, with invitations being sent via email or generated links. This inclusive approach ensures that all relevant parties can contribute their expertise and insights.

Team interaction within the collaborative space is dynamic and real-time. Team members engage in discussions, share insights, and collaboratively review threat models. This interaction is crucial for achieving a well-rounded and thoroughly vetted threat model. The sharing of threat models, insights, and best practices among team members cultivates collective security intelligence, leveraging the diverse expertise present in the team.

Optional anonymous contributions provide a judgment-free environment for sharing ideas and expertise, encouraging open and unbiased participation. The real-time chat feature enhances the collaborative experience, allowing team members to discuss threat scenarios, mitigation strategies, and risk assessments promptly and efficiently.

Document sharing and annotation further enrich the collaboration. Users can upload relevant documents, and team members can provide annotations and feedback, creating a comprehensive repository of shared knowledge and resources. The integration of CollaSpace facilitates seamless communication and collaboration between teams, even from different organizations, enhancing the breadth and depth of the collaborative effort.

Thread-based discussion threads help organize conversations around specific topics, ensuring focused and relevant discussions. The validation of generated threats by collaborators introduces diverse perspectives, refining the threat list with insights from various domain experts. Teams work together to devise and refine mitigation strategies, pooling their combined expertise for more effective and comprehensive solutions.

Optional creation of detailed threat reports by teams captures the collective insights and decisions made throughout the threat modeling process. This documentation is invaluable for record-keeping, communication, and future reference. Maintaining a decision log records consensus decisions, responsibilities, and the rationale behind them, ensuring clarity and accountability.

The integration of feedback from collaborators into the threat model enhances its quality and relevance. Support for document versioning allows teams to track changes and revert to previous versions if necessary, providing flexibility and control over the evolution of the threat model.

Managing permissions and access control ensures that sensitive information is shared only with authorized individuals, maintaining the integrity and confidentiality of the collaborative effort. Automated notifications keep team members updated about new contributions, comments, or changes, fostering an environment of continuous engagement and responsiveness.

Project progress tracking ensures that the collaborative effort remains aligned with project goals and timelines. Optional data visualization on collaborative dashboards provides a clear overview of the project's progress, metrics, and collaborative efforts, aiding in project management and decision-making.

Insights gained from collaborative discussions broaden users' understanding of threat scenarios and mitigation strategies, contributing to their professional growth and expertise in threat modeling. Finally, the conclusion of the project preserves the collaborative insights, marking the end of a successful collaborative session. The ongoing feedback loop continuously enhances the collaborative process and refines threat models, ensuring that the system remains adaptable, relevant, and effective in the ever-evolving landscape of cybersecurity threats.

Data Encryption Techniques

The threat modeling system employs a comprehensive suite of data encryption mechanisms to ensure the highest level of security and confidentiality throughout its operations. These mechanisms are integral to protecting user data, communications, and collaborative interactions within the system.

Transport Layer Security (TLS) is employed for all communications between users and the platform. This encryption ensures that data transmitted over the internet remains confidential and secure from unauthorized access. The use of TLS is fundamental in maintaining the integrity of data as it moves from one point to another within the system.

End-to-End Encryption is a crucial feature for collaborative interactions, messages, and data exchanges between users. This encryption ensures that only authorized recipients can decrypt and access the information, providing an additional layer of security and privacy. This mechanism is particularly important in scenarios where sensitive data is shared or discussed.

Data Encryption at Rest protects stored user data and project information. By employing encryption-at-rest mechanisms, the system ensures that data remains secure and unreadable even in the event of unauthorized access to the storage media. This feature is vital for protecting data integrity and preventing data breaches.

The platform utilizes Strong Encryption Algorithms, including the Advanced Encryption Standard (AES), along with robust key management practices. These industry-standard algorithms are critical in safeguarding the confidentiality of data stored or processed by the system.

Key Management is handled with utmost security, managing the encryption keys used for data protection. This system prevents unauthorized access to the keys, thereby enhancing the overall security posture of the platform.

User Authentication and Authorization controls user access through secure authentication mechanisms. Access privileges are assigned based on roles and permissions, ensuring that only authorized individuals have access to specific data sets, thereby preventing unauthorized data access.

Secure Chat Encryption is employed in the real-time chat feature, ensuring that chat messages remain private and secure. This end-to-end encryption is crucial in preventing unauthorized interception of communications within the platform.

Document-Level Encryption is applied to documents shared among collaborators. This encryption ensures that the contents of the documents remain protected, even if the document file is compromised.

Threat Model Encryption ensures that threat models created and shared within the system are encrypted. This feature guarantees that the details and insights in the threat models are accessible only to authorized users.

CollabSpace Encryption protects collaborative data exchanged across organizations. This encryption is key in maintaining the security and privacy of shared information within the collaborative space.

Optional Anonymous Encryption is available for features like ThreatWhispers and anonymous contributions. Users can enable this encryption to maintain privacy, especially when choosing to remain anonymous.

Key Exchange Protocols are used when users join collaborative sessions or discussions. These protocols establish encrypted communication channels, ensuring secure interactions within the system.

Regular Security Audits are conducted to ensure that the encryption mechanisms remain up-to-date, robust, and aligned with industry standards. This practice is essential for maintaining a high-security standard and adapting to evolving cybersecurity threats.

Constant Monitoring and Improvement of the encryption mechanisms ensure that the system adapts to emerging security threats and vulnerabilities. This continuous improvement approach is critical in maintaining a robust and secure threat modeling environment.

The threat modeling system's integration with blockchain technology introduces a suite of features that significantly enhance the security, transparency, and integrity of the threat modeling process. This integration addresses several key aspects of the system's operation, ensuring a highly secure and efficient environment.

Blockchain Integration

Immutable Record Keeping is achieved through the implementation of a private blockchain. This blockchain creates an immutable and tamper-proof ledger of all user activities, including changes to threat models, collaboration interactions, and data access. This feature ensures a transparent and verifiable audit trail, allowing all parties involved to trace and authenticate historical transactions and changes.

Data Integrity and Validation are enhanced using blockchain's consensus mechanism. This mechanism validates the integrity of threat model changes and collaborative inputs. Each change is cryptographically hashed and recorded on the blockchain, providing a secure method to prevent unauthorized alterations and ensuring the authenticity of the data.

Decentralized Identity Management is integrated into the system using blockchain technology. This approach to identity management enhances user authentication and authorization processes. Users' digital identities are securely stored on the blockchain, significantly reducing the risk of centralized identity breaches and unauthorized access.

Smart Contracts for Collaboration are employed to automate and enforce collaboration agreements among users. These smart contracts define roles, permissions, and actions within the threat modeling process, ensuring that only authorized users can access and modify threat models. This feature streamlines the collaborative process, enhancing security and efficiency.

Secure Data Sharing is implemented using encrypted and permission-based sharing protocols powered by blockchain technology. Users can securely share threat models and collaborate while retaining full control over who can access their data. This approach to data sharing maintains confidentiality and privacy, essential in collaborative environments.

Anonymous Contributions with Traceability are facilitated through blockchain integration. This feature allows users to contribute anonymously while maintaining a traceable record of their contributions on the blockchain. This approach enhances transparency and accountability without compromising the anonymity of contributors.

Secure Payments and Incentives, where applicable, are handled using blockchain to facilitate secure microtransactions or rewards for contributors. Smart contracts automate these payment processes, ensuring transparency and efficiency while minimizing the need for intermediaries.

Supply Chain Security is particularly enhanced for industries with complex supply chains. Blockchain integration in these scenarios ensures transparency, traceability, and verification of components and entities involved in the supply chain, aiding in comprehensive threat modeling related to supply chain security.

Audit and Compliance Reporting is streamlined through automated report generation using data extracted from the blockchain. This feature showcases user activities, collaboration history, and modifications to threat models, simplifying the process of compliance reporting and regulatory audits.

An Immutable Threat Intelligence Repository is created to store threat intelligence securely. This repository ensures that curated threat reports and insights are securely stored on the blockchain and accessible only to authorized users, thereby enhancing the credibility and reliability of threat intelligence data.

Enhanced Data Privacy is achieved as blockchain technology enables granular control over data sharing and access permissions. Users can maintain sovereignty over their personal and sensitive information, choosing how and with whom their data is shared, ensuring compliance with privacy standards and regulations.

Additional Functionality

One of the system's important functionalities is the ability to support the import of threat-related data from diverse file formats, enabling users to leverage existing threat intelligence and data sources in their threat modeling processes. This feature facilitates the uploading and importing of data from CSV files, allowing users to map columns in these files to relevant threat modeling attributes within the tool. The imported data undergoes validation for consistency and accuracy, and users receive feedback on the success or failure of the import process, ensuring a seamless integration of external data into the threat modeling workflow.

Moreover, the tool extends its data import capabilities to XML files. It supports the import of threat data stored in XML format, and users can define XML schemas to map the imported data to threat modeling elements within the tool. The tool validates XML data against the defined schema, identifying any issues, and allows users to review and confirm the import results. This feature ensures that data from XML files is accurately integrated into the threat modeling system, enhancing the versatility and comprehensiveness of the tool.

Additionally, the system allows for the import of threat-related data from JSON files. It provides a visual mapping interface where users can match JSON properties to threat modeling attributes, ensuring a user-friendly and efficient data integration process. The imported JSON data is parsed and validated for correctness, and users are presented with a summary of the imported data along with any potential discrepancies, offering a transparent and accurate data import experience.

Furthermore, the tool facilitates the integration of data from existing threat modeling tools. Organizations that have previously utilized other threat modeling tools can import their existing threat models into the System. The tool supports common formats from tools such as OWASP Threat Dragon or Microsoft Threat Modeling Tool, automatically converting imported models to the System's format while preserving essential threat data. This feature allows for a smooth transition and integration of existing threat models, ensuring continuity and efficiency in the threat modeling process.

The system also enables the import of textual threat information from common document formats like DOCX and PDF. It integrates text extraction and parsing capabilities to process these documents, organizing the extracted text for further threat modeling analysis. This feature enhances the tool's ability to incorporate a wide range of data sources, further broadening its application and utility in diverse threat modeling scenarios.

For organizations with extensive threat data repositories, the tool offers a bulk import functionality. Users can upload large datasets, and the tool efficiently processes and integrates this data into threat models. This capability is particularly beneficial for large-scale organizations or projects where vast amounts of threat data need to be incorporated into the threat modeling system quickly and accurately.

The System UTMod Framework is a notable feature of the tool, designed to simplify the creation of threat models. This framework guides users through the threat modeling process using an intuitive interface, suggesting components and threats that align with the system's ecosystem and best practices. The UTMod Framework exemplifies the tool's commitment to providing a streamlined and user-friendly threat modeling experience.

In the realm of AI-driven capabilities, the tool features ModAdvisor, an AI-driven threat scenario generation component. ModAdvisor automates the generation of threat scenarios based on initial threat models, offering clear explanations for each generated scenario using the system's threat intelligence. This feature showcases the tool's advanced AI capabilities, enhancing the realism and accuracy of threat modeling.

Risk assessment and mitigation are integral to the tool's functionality, specifically leveraging the AutoComply feature. AutoComply focuses on integrated risk assessment and mitigation, allowing users to evaluate risks associated with generated threat scenarios and receive automated mitigation recommendations. Users can interactively customize mitigation strategies, demonstrating the system's adaptability and user-centric approach.

The system also integrates real-time threat intelligence through the ThreatTrove feature. It provides users with access to live threat data from diverse global feeds, emphasizing the system's awareness and responsiveness to the ever-evolving global threat landscape. This integration ensures that users are equipped with the most current and relevant threat intelligence, enhancing the overall effectiveness of the threat modeling process.

Example Use Cases

In the execution of the present invention, a diverse array of applications across various industries is contemplated, each addressing specific security challenges and requirements inherent to these domains.

Within the healthcare industry, the invention is tailored to focus on securing patient data, medical devices, and health information systems. The system integrates frameworks that are specialized for healthcare, addressing critical threats such as data breaches, privacy violations, and vulnerabilities in medical devices. This ensures a robust approach to safeguarding sensitive health information and patient data integrity.

In the financial services sector, the invention places emphasis on threats related to transaction security, fraud prevention, and protection of customer data. The integration of frameworks within the system is valuable for performing risk assessments specific to financial applications, as well as ensuring compliance with relevant financial regulations. This application is crucial in maintaining the integrity and security of financial transactions and sensitive customer information.

For e-commerce and retail industries, the invention is designed to address threats to customer data, payment gateways, and supply chain processes. The system incorporates frameworks that specifically target risks associated with online payment fraud, identity theft, and disruptions in supply chain operations, thereby ensuring the security of e-commerce platforms and their users.

In the news industry, the emergence of AI-driven deepfake technology poses significant challenges to information integrity. Addressing this, our system introduces 'FauxMod,' a specialized use case focused on Deep Fake Threat Modeling. FauxMod leverages the system to simulate and identify potential deepfake threats within digital media, enabling news organizations to pre-emptively assess and mitigate risks associated with fabricated content, improving the credibility and trustworthiness of news in the digital age.

Industries such as energy, transportation, and utilities, which constitute critical infrastructure, require robust protection from cyber threats. The system integrates frameworks that are specialized in assessing and mitigating risks to systems such as Supervisory Control and Data Acquisition (SCADA) vulnerabilities, catering to the unique security needs of these vital sectors.

For cloud service and Software as a Service (Saas) providers, the platform is geared towards securing cloud infrastructure and Application Programming Interfaces (APIs). Frameworks within the system evaluate risks pertaining to multi-tenancy, data leakage, and API vulnerabilities, ensuring comprehensive security measures are in place to protect cloud-based services and their users.

In the realm of the Internet of Things (IoT), the invention addresses threats to connected devices and ecosystems. The system integrates frameworks tailored to IoT-specific risks such as unauthorized access, device manipulation, and data interception. This application is particularly crucial given the pervasive nature of IoT devices and their integration into various aspects of daily life.

For government agencies and defense organizations, the platform accentuates the protection against threats to national security, critical data, and communication systems. The system incorporates frameworks that align with government security standards and policies, ensuring that these high-stakes environments are safeguarded against potential cyber threats.

Startups and small businesses often require a more simplified approach to threat modeling due to limited resources and expertise. To this end, the system provides user-friendly frameworks that are specifically tailored to meet the needs of these smaller organizations, facilitating effective threat modeling without necessitating extensive cybersecurity knowledge.

Industries subject to stringent regulatory compliance, such as healthcare (adhering to HIPAA) or finance (complying with PCI DSS), benefit from the system's integration of frameworks that align with these regulations. The system guides users through a compliance-focused threat modeling process, aiding them in meeting necessary regulatory standards.

Finally, the system offers the capability to customize threat modeling scenarios based on specific industry requirements. Users can configure and utilize frameworks integrated within the system to suit their unique industry use cases, allowing for a tailored approach to cybersecurity that addresses specific threats and challenges of individual sectors.

Example Software Implementations

The present invention, a comprehensive computer-implemented threat modeling system, is not confined to the exemplary implementations of technologies, methodologies, or infrastructure components described herein. The described embodiments involving various frontend technologies such as React, Angular, and Vue.js are representative; the invention is applicable to any frontend technology capable of rendering the required interactive user interfaces. Similarly, backend implementations using Node.js, Python, Java, or equivalent programming languages and technologies are exemplary and non-limiting, as the invention can be executed on a variety of backend platforms that support the functionality of threat modeling systems.

In the context of database systems, while specific examples such as MongoDB, PostgreSQL, and Elasticsearch are provided, the invention is adaptable to utilize any database system capable of effectively storing, retrieving, and managing the requisite data for threat modeling. Cloud platforms such as AWS, Azure, and Google Cloud are mentioned for illustrative purposes; the invention is compatible with any cloud platform that offers the necessary computational resources and services.

Microservices architecture, exemplified by the use of Docker and Kubernetes, is an illustrative implementation. The invention encompasses any microservices framework or tools that facilitate the efficient deployment, scaling, and management of application services. Security layers and protocols are crucial to the invention, and while SSL/TLS, OAuth, JWT, and SIEM are cited, the invention is not restricted to these technologies. It includes any security layers and protocols ensuring secure data transmission and integrity.

Data privacy compliance is exemplified through adherence to regulations such as GDPR, HIPAA, and CCPA. However, the invention is designed to be adaptable to various data privacy laws and regulations across different jurisdictions. Artificial Intelligence and Machine Learning technologies, including but not limited to GPT-4, Learning Language Models (LLM), and Natural Language Processing (NLP) models, are referenced as examples. The invention is amenable to integration with any AI/ML technologies providing equivalent or superior functionality in threat modeling and analysis.

Infrastructure components such as load balancers, Content Delivery Networks (CDN), and firewalls are mentioned for demonstrative purposes. The invention can incorporate any suitable infrastructure components that ensure effective network traffic distribution, content delivery, and security. Similarly, monitoring tools like Prometheus, Grafana, and the ELK Stack are cited as examples, with the invention being compatible with any monitoring systems that facilitate operational data tracking, visualization, and analysis.

Integration with other systems and components is exemplified through the use of RESTful APIs and Webhooks, but the invention is not limited to these technologies. It can incorporate any suitable integration technologies or protocols that enable effective communication and data exchange. Authentication mechanisms, including Multi-factor Authentication and Single Sign-On (SSO), are illustratively mentioned. The invention is adaptable to include any secure authentication mechanisms that provide controlled access to the system.

Network Components

The cloud infrastructure is configured to communicate with a set of client devices by various means over the network architecture. The client devices include devices configured to communicate with the cloud infrastructure via a communications tower. These devices may include but are not limited to a smartphone, a laptop, and a tablet computer with e-mail and web browser application software.

Any one of the client devices may be operationally coupled to a wide area network (WAN) such as the Internet with a wireless connection. The wireless clients may be communicatively coupled to the WAN via a Wi-Fi (or Bluetooth) access point that is communicatively coupled to a modem, which is communicatively coupled to the WAN. The wireless clients may also be communicatively coupled to the WAN using a proprietary carrier network that includes communication tower.

While a specific set of client devices are listed as examples of the architecture, the client devices may in fact be any suitable device. For example, client devices could include a mobile handset, mobile phone, wireless phone, portable cell phone, cellular phone, portable phone, a personal digital assistant (PDA), a tablet, a portable media device, a wearable computer, or any type of mobile terminal which is regularly carried by an end user and has all the elements necessary for operation in a wireless communication system. The wireless communications include, by way of example and not of limitation, CDMA, WCDMA, GSM, UMTS, or any other wireless communication system such as wireless local area network (WLAN), Wi-Fi or WiMAX.

In some examples, each client device may be associated with or "logged in" to as user profile or e-mail address in order to operate within the disclosed system and method, and further configured to send requests, upload user data, and generally interact with the cloud infrastructure via a user interface displayed on the device. In this manner one or more users may access an online platform or web page in order to interact with the system and methods of the present disclosure.

The operations described above for the app may be implemented by one or more servers or computers over a wireless network which the user device are communicating through. Indeed, it should be understood that the operations described herein may be carried out by any suitable processor architecture.

A server as described herein can be any suitable type of computer. A computer may be a uniprocessor or multiprocessor machine. Accordingly, a computer may include one or more processors and, thus, the aforementioned computer system may also include one or more processors. Examples of processors include sequential state machines, microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), gated logic, programmable control boards (PCBs), and other suitable hardware configured to perform the various functionality described throughout this disclosure.

The computer may advantageously be equipped with a network communication device such as a network interface card, a modem, or other network connection device suitable for connecting to one or more networks.

A computer may advantageously contain control logic, or program logic, or other substrate configuration representing data and instructions, which cause the computer to operate in a specific and predefined manner as, described herein. In particular, the computer programs, when executed, enable a control processor to perform and/or cause the performance of features of the present disclosure. The control logic may advantageously be implemented as one or more modules. The modules may advantageously be configured to reside on the computer memory and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro code, circuitry, data, and/or the like.

The control logic conventionally includes the manipulation of digital bits by the processor and the maintenance of these bits within memory storage devices resident in one or more of the memory storage devices. Such memory storage devices may impose a physical organization upon the collection of stored data bits, which are generally stored by specific electrical or magnetic storage cells.

The control logic generally performs a sequence of computer-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, text, terms, numbers, files, or the like. It should be kept in mind, however, that these and some other terms should be associated with appropriate physical quantities for computer operations, and that these terms are merely conventional labels applied to physical quantities that exist within and during operation of the computer based on designed relationships between these physical quantities and the symbolic values they represent.

It should be understood that manipulations within the computer are often referred to in terms of adding, comparing, moving, searching, or the like, which are often associated with manual operations performed by a human operator. It is to be understood that no involvement of the human operator may be necessary, or even desirable. The operations described herein are machine operations performed in conjunction with the human operator or user that interacts with the computer or computers.

It should also be understood that the programs, modules, processes, methods, and the like, described herein are but an exemplary implementation and are not related, or limited, to any particular computer, apparatus, or computer language. Rather, various types of general-purpose computing machines or devices may be used with programs constructed in accordance with some of the teachings described herein. In some embodiments, very specific computing machines, with specific functionality, may be required.

CONCLUSION

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the threat modelling system of the invention have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A computer-implemented threat modeling system, comprising:

a threat modeling engine communicatively coupled with a user interface module, the engine configured to process electronic input data relating to threat modeling and to generate digital representations of threat scenarios;

a database system structured to store electronic data comprising user input data, generated threat scenarios, and threat mitigation strategies;

an artificial intelligence module, operationally integrated with the threat modeling engine, employing machine learning algorithms and natural language processing capabilities to analyze the electronic input data and to autonomously generate threat scenarios;

a collaboration module designed to enable interactive information exchange among multiple users engaged in threat modeling, the module facilitating features for real-time communication, annotation, version control, and secure sharing of threat models;

a methodology and framework selection module, operable to enable application and selection of diverse threat modeling methodologies and frameworks within a threat modeling system;

an integration module, architected to interface with external systems and tools to import and export data, thereby enhancing accuracy of threat modeling;

a cloud-based infrastructure component for supporting a deployment and operational functionality of the threat modeling system, configured for scalability and accessibility;

a blockchain integration component for ensuring data integrity and immutability of the stored threat data, scenarios, and mitigation strategies;

a multilingual support module, configured to provide user interface functionality and system interaction in multiple languages; and a cross-platform compatibility module, ensuring operability of the threat modeling system across a variety of computing platforms.

2. The computer-implemented threat modeling system of claim 1, wherein the threat modeling engine comprises a methodology and framework module, configured to support a diverse array of threat modeling methodologies and frameworks including, but not limited to, Spoofing, Tampering, Repudiation, Information Disclosure, Denial of Service, and Elevation of Privilege (STRIDE); Damage Reproducibility, Exploitability, Affected Users, and Discoverability (DREAD); Process for Attack Simulation and Threat Analysis (PASTA); TRIke, Attack Trees, Common Vulnerability Scoring System (CVSS), Operationally Critical Threat, Asset, and Vulnerability Evaluation (OCTAVE), Common Attack Pattern Enumeration and Classification (CAPEC), Visual Agile and Simple Threat modeling (VAST), and LINDDUN.

3. The computer-implemented threat modeling system of claim 1, further comprising an AI/ML integration module, wherein the AI/ML integration module includes advanced algorithms based on GPT-4 for natural language processing, pattern recognition, contextual analysis, automated scenario generation, and risk assessment, and is further configured to incorporate additional machine learning algorithms, clustering algorithms, decision trees, Bayesian networks, neural networks, expert systems, genetic algorithms, fuzzy logic, and reinforcement learning algorithms for enhanced analysis and generation of threat scenarios.

4. The computer-implemented threat modeling system of claim 1, further comprising a collaboration and communication layer, the layer being configured to enable and facilitate interactive information exchange and collaboration among multiple users engaged in threat modeling activities, and including features for real-time discussions, annotations, version control, and secure sharing of threat models, thereby fostering a collaborative environment for cybersecurity professionals.

5. The computer-implemented threat modeling system of claim 1, wherein the user interface module is configured to support multilingual interaction, including, but not limited to, languages such as English, Spanish, Chinese (Mandarin), Russian, Arabic, French, German, Japanese, Portuguese, and Korean, thereby accommodating users from diverse linguistic backgrounds and enhancing the global accessibility of the system.

6. The computer-implemented threat modeling system of claim 1, wherein the integration module is architected to facilitate seamless connectivity with external systems and tools for the import and export of data, including integration capabilities with Continuous Integration/Continuous Deployment (CI/CD) pipelines and RESTful Application Programming Interfaces (APIs), thereby enhancing the system's interoperability and data accuracy.

7. The computer-implemented threat modeling system of claim 1, wherein the threat modeling engine utilizes the SECURE methodology, the methodology comprising distinct modules for System Analysis, Enumeration, Cyber Attack Simulation, Understanding the Risk Level, Remediation, and Evaluation, each module systematically contributing to the identification, analysis, and mitigation of cybersecurity threats.

8. The computer-implemented threat modeling system of claim 1, further comprising a System UTMod Framework for unified threat modeling, the framework integrating best practices from across the cybersecurity spectrum, and providing a comprehensive and adaptable approach to threat modeling.

9. The computer-implemented threat modeling system of claim 1, further comprising specialized modules designed for specific sectors and technologies, including but not limited to AI-assisted security insights, a gamified approach to threat modeling, secure coding practices, and System Discoverability.

10. The computer-implemented threat modeling system of claim 1, further comprising a repository module for accessing a curated collection of pre-built threat models for various scenarios and industries, a real-time threat intelligence module for gathering and analyzing global threat data, an anonymous platform for sharing and receiving threat modeling feeds and news, and a collaborative research hub for enabling the exchange of threat research and intelligence among cybersecurity professionals.

11. The computer-implemented threat modeling system of claim 1, further comprising a data management and security layer that utilizes robust encryption mechanisms, implements stringent access controls, and maintains compliance with key data protection regulations including the General Data Protection Regulation (GDPR), Health Insurance Portability and Accountability Act (HIPAA), and California Consumer Privacy Act (CCPA).

12. The computer-implemented threat modeling system of claim 1, wherein the backend services are implemented using a combination of programming languages including Node.js, Python, and Java, and the system's databases are comprised of MongoDB, PostgreSQL, and Elasticsearch, providing a versatile and scalable data management infrastructure.

13. The computer-implemented threat modeling system of claim 1, further comprising a reporting and visualization module for generating comprehensive threat modeling reports and interactive visualizations to highlight vulnerabilities and risk levels.

14. The computer-implemented threat modeling system of claim 1, further comprising a blockchain integration component ensuring data integrity and immutability of threat data, scenarios, and mitigation strategies.

15. The computer-implemented threat modeling system of claim 1, wherein the artificial intelligence and machine learning integration module is configured for adaptive learning to enhance the accuracy and relevance of generated threat scenarios and risk assessments based on real-world data and user feedback.

16. The computer-implemented threat modeling system of claim 1, further comprising a collaborative workspace module for team collaboration and sharing of threat models, insights, and best practices within the organization or community.

17. The computer-implemented threat modeling system of claim 1, wherein the threat modeling engine includes an automated and AI-driven feature for comprehensive threat modeling and report generation.

18. The computer-implemented threat modeling system of claim 1, further incorporating a compliance monitoring module to automate the assessment of threat models against industry standards and regulations.

19. The computer-implemented threat modeling system of claim 1, further comprising a security blueprint modeling module enabling users to create detailed security blueprints enriched with security paradigms for strategic design choices in threat modeling.

* * * * *